United States Patent
Duren

[11] 3,718,225
[45] Feb. 27, 1973

[54] VEHICLE CARRIER ASSEMBLY

[76] Inventor: John B. Duren, 126 W. Main Street, Osage, Iowa 50461

[22] Filed: March 11, 1971

[21] Appl. No.: 123,208

[52] U.S. Cl. ............214/450, 224/42.07, 214/83.24
[51] Int. Cl. ................................................B60r 9/00
[58] Field of Search......214/450, 451, 452, 453, 454, 214/83.24; 224/42.07

[56] References Cited

UNITED STATES PATENTS

| | | | |
|---|---|---|---|
| 3,058,636 | 10/1962 | Bilbeisi | 224/42.07 |
| 3,612,366 | 10/1971 | Schneider | 214/450 |
| 2,896,804 | 7/1959 | Ingram | 214/450 |
| 2,551,351 | 5/1951 | Swenson | 214/450 |
| 3,527,371 | 9/1970 | Townsend | 214/450 |

Primary Examiner—Albert J. Makay
Assistant Examiner—John Mannix
Attorney—Petherbridge, O'Neill & Lindgren

[57] ABSTRACT

A carrier assembly for transporting a vehicle or other object of an automobile or the like wherein the carrier includes a slideable platform to lift the object into transporting position. The platform is slideably mounted in a frame adapted to be attached to the transporting vehicle in a sloped orientation to readily effect reciprocating movement of the platform from the ground to the transported position and vice versa. A hand crank and cable is attached to the frame to control the desired movement of the platform upwardly or downwardly. The crank and cable can also be used to secure a vehicle or other object to the carrier platform and at the same time secure carrier platform to the carrier frame.

5 Claims, 4 Drawing Figures

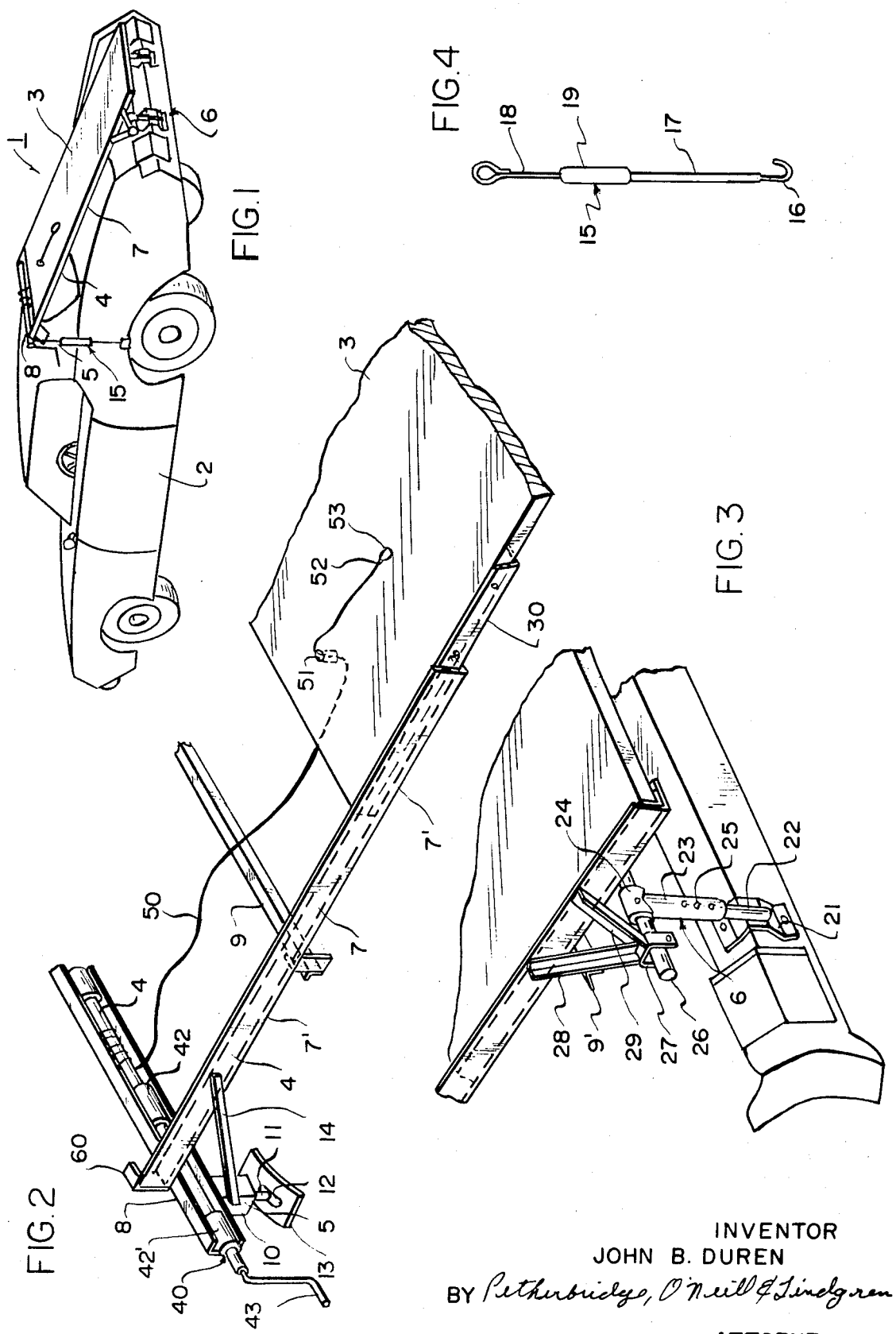

VEHICLE CARRIER ASSEMBLY

BACKGROUND OF THE INVENTION

This invention relates to a carrier assembly and, in particular, to a novel carrier to be attached to an automobile or the like for transporting an object such as a vehicle or other relatively large objects.

More specifically, the invention relates to a carrier assembly adapted to be mounted in a sloped orientation upon a vehicle wherein a frame mounted thereon slideably supports a platform which is movable from a lower position adjacent the ground to an upper position upon the automobile. A crank and cable attached to the platform are utilized to provide control of movement of the platform. When the platform is in its upper position in support of an object, the carrier assembly safely and effectively secures the object on the automobile for transporting the object for any desired distance.

Although not intended to be so limited, for convenience of illustration the carrier assembly is described for use in transporting a vehicle such as a snow mobile. It is often desirable to transport large objects on the exterior of the body of an automobile with safety and ease. Particularly, with vehicles such as snow mobiles gaining great popularity in recent years, it is necessary to carry the vehicles to locations where they may be utilized. In the past, the snow mobile was commonly carried on a trailer hitched to the car for transportation purposes. However, the use of trailers for carrying snow mobiles and other all terrain and special vehicles and other heavy objects is inconvenient, frequently unsafe, and generally more costly. In addition, trailers are more difficult to store during non-use periods. When weather conditions are ideal for snowmobiling they are likewise not ideal for towing a snowmobile trailer because of lack of traction and because small trailers frequently have their wheels closer together than the car wheels thus causing towing difficulty because the trailer must cut a separate track through the snow. In addition, there are generally fewer places to park an automobile and trailer combination during ideal snowmobile conditions because snow is frequently not removed from areas where parking of cars with trailers would normally be permitted during non-winter conditions. To overcome the inconvenience of using a trailer, several techniques are employed in the prior art for carrying a vehicle on the car itself thereby eliminating the necessity of using a trailer.

Many of the carriers employed previously have been deficient in several aspects. For example, some carriers provide effective securing of the object once it was placed in position on the automobile but if the object was relatively heavy in weight, such as a snow mobile, a great deal of effort is required to lift the particular object onto the support positioned on the car.

The support also must provide adequate securement of the object upon the body to enable the automobile to travel at normal speeds. However, numerous techniques heretofore employed were deficient in safely and reliably carrying a heavy object such as a snow mobile. Moreover, it is desirable that the support can carry the object in a manner to eliminate damage to the exterior of the automobile as many prior art assembly effect produce. Therefore, it is advantageous to provide an inexpensive and effective carrier to enable an object such as a snow mobile to be transported by an automobile with ease and safety.

SUMMARY OF THE INVENTION

It is, therefore, an object of this invention to improve the transporting of an object upon a vehicle such as an automobile.

Another object of this invention is to secure a vehicle or object to an automobile in an effective and safe manner.

A further object of this invention is to reduce the effort required for lifting a vehicle from the ground to a position upon an automobile.

Still another object of this invention is to minimize damage to the exterior of an automobile when carrying objects on the exterior thereof.

These and other objects are attained in accordance with the present invention wherein there is provided an improved carrier assembly for supporting a vehicle or other object upon an automobile and the like for the transporting thereof. A frame is removably attached to the automobile and includes a pair of rails which slideably maintain a platform therebetween. The longitudinal axis of the tracks extend in a sloped orientation to allow the platform to be lifted or lowered from ground to a position on the auto or adjacent the ground. The novel design of the invention permits the safe carrying of heavy objects by an DRAWINGS in a convenient manner. The slidable platform allows the vehicle to be placed upon a platform and raised into position on the automobile without requiring any substantial lifting by hand of the object to be transported. Moreover, the carrier assembly herein described is constructed of a minimum of elements thereby creating a carrier which is lightweight, inexpensive and easy to install. The design of the frame provides a supporting means that is in contact with only a minimum area of the vehicle thereby preventing any damage to the automobile when the assembly is attached.

DESCRIPTION OF THE DRAWINGS

Further objects of the invention, together with additional features contributing thereto and advantages accruing therefrom, will be apparent from the following description of an embodiment of the invention when read in conjunction with the accompanying drawings wherein:

FIG. 1 is a perspective illustration of the carrier assembly of the invention mounted upon an automobile;

FIG. 2 is an enlarged partial perspective illustration of the carrier assembly of FIG. 1;

FIG. 3 is an enlarged partial perspective illustration of the lower mounting means of the carrier assembly of FIG. 1;

FIG. 4 is an enlarged side schematic illustration of the coupling cable of the carrier assembly.

DESCRIPTION OF THE PREFERRED EMBODIMENT

Referring to FIG. 1, there is shown a perspective view of a carrier assembly 1 of the invention mounted on an automobile 2. The central element of carrier assembly 1 is a slideable platform 3 which is adapted to support on its upper surface the object to be transported on the automobile. The platform 3 is constructed in a panel-like form to provide an adequate surface area for carrying the object being transported and is formed from any suitably strong material such as, for example, plywood, plastic material and the like.

The platform 3 is supported upon automobile 2 by means of a frame assembly 4 which is secured and supported by a pair of upper support means 5 and lower support means 6, respectively. Frame assembly 4 includes a pair of parallel L-shaped channel members 7 which extend along the longitudinal axis of the carrier assembly. The pair of track members 7 are coupled together at their upper end by means of a U-shaped cross member 8 positioned beneath lower side 7' of the channel members in securement thereto by any suitable technique such as welding, bolts and the like. Cross member 8 is constructed in a U-shaped configuration which opens in the direction of extension of the channel members. Preferably, the U-shaped cross member 8 is an elongated member of a length greater than the distance between the pair of parallel channel members. To aid in the additional supporting of the two channel members 7, a second cross member 9 of any configuration is attached to the bottom of side 7' of the channel member by any technique such as welding and the like and also a third cross member 9' is attached to strut 28. The respective cross members 8, 9 and 9' and the pair of channel members may be constructed of a suitably strong material such as a metal.

A pair of supporting means 5 are attached to the bottom surface of cross member 8 to support frame 4. Each of the support means 5 includes a column 10 which is attached at its upper top surface to the underside of the U-shaped cross member 8 by any conventional securement method. Support column 10 comprises any desired configuration such as a rectangular member and possesses on its bottom a rod-like projection 11. Projection 11 is adapted to be inserted in a slot 12 formed in a cushioning pad 13 positioned directly on the automobile body generally in the area of the roof thereof. Cushioning pad 13 is constructed of a relatively strong and flexible material so as to not damage the body of the automobile. The end of projection 11 extends into the slot for securement in any position therein to adjust for varying shapes of the surface upon which the pad is mounted. Any conventional adjustable slot and pin means may be utilized in connection with support member 5 to achieve the desired adjustability of the projection within the slot. In order to provide more support to the channel member, a support rod 14 is attached to column 10 and to the underside of each of the channel members 7 to add an additional support strut to the carrier assembly.

To secure the mounting pad to the body a pair of elongated tensioning means 15 extends on both sides of the car from U-shaped cross member 8 to a hook-like member 16 mounted at the other end thereof adapted to engage the underside edge of the automobile. As best shown in FIG. 4 tensioning means includes lower portion 17 connected to the hook of the tensioning means which is in the form of a flat element such as a belt in order that the lower portion which is in contact with the body of the automobile will not effect damage thereto. The upper portion of the tensioning means is in the form of a cable 18 which is tied or otherwise secured to cross member 8 to provide a downward biasing force to cause the supporting means to be urged in an immovable condition against the automobile. To provide adjustability of the length and tension of the tensioning means, a conventional turn buckle 19 may be utilized to interconnect the lower portion 17 and the upper portion 18 of the tensioning means to achieve the desired tensioning thereof. Alternatively, any other adjustable means interconnecting the two portions of the tensioning means may be employed in conjunction with the invention as desired.

Lower support means 6 comprise a pair of spaced members to carry the bottom portion of the carrier assembly 1 each and are attached to the automobile by brackets 21 which may be bolted, as best shown in FIG. 3 of the drawing, to the bumper of the automobile. Alternatively, the brackets may include means which are secured around the bumper without requiring the bolting thereon. Bracket 21 supports a column member 22 which is welded or otherwise attached to the bracket. The column member 22 receives in telescopic relationship a hollow tube 23 which includes at its upper surface a second hollow tube portion 24 oriented perpendicular to tube 23. Both the column member 22 and the hollow tube 23 include a plurality of holes 25 wherein a pin (not shown) may be inserted in matching holes of the respective members to adjust the relative telescopic position of the column and the tube. Thus, the elevation of the tube with relation to the automobile may be selectively adjusted.

The second tube 24 at the top of hollow tube 23 is adapted to receive and support a transversely extending rod 26 which extends between the two spaced support members 6 and has a length greater than the distance between the two supporting means. Brackets 27 which have a U-shaped bottom portion are used to secure the carrier assembly to rod 26. A pair of diverging support struts 28 and 29 are secured at one end by welding or the like to the upper surface of bracket 27 and at the other end to the channel members 7 to provide support thereof. The rod 26 extending between the two support means 6 may also be in contact with the bottom of the channel members 7 to aid in the support of the carrier assembly to insure that a heavy object such as a snow mobile or other vehicle can be carried by the automobile. From the foregoing, it should be apparent that the carrier assembly of the invention is readily installed upon an automobile and may readily be removed as desired.

The L-shaped channel members 7 are oriented such that one side forms a bottom surface 7' and the adjacent side 7" creates a side surface which creates a track for slideably supporting platform 3. In order to insure proper riding of the platform upon the channel members, the side edges of the platform include a L-shaped bearing member 30 in attachment thereto to bear against the respective sides 7' and 7" of the tracks as best shown in FIG. 2. Referring to FIGS. 1 and 2, it can be seen that platform 3 is slideable from a top position where it is adapted to carry the object being transported on the automobile to a bottom position where it slides adjacent the ground for loading or unloading. At the ground position, the object to be transported may be lifted, driven or otherwise placed upon the platform and the platform may then be elevated to its upper position upon the automobile.

To control and effect the necessary upward and downward motion of the platform, a conventional winch 40 is employed which is mounted within the upper U-shaped cross member 8. The winch includes a rod 41 and is mounted in a plurality of bearing-like elements 42 which are secured within the U-shaped channel by any suitable technique. The rod of the winch may be rotated by turning hand-crank 43 positioned adjacent the end of the U-shaped cross member. The rotary motion of the winch is transmitted to the platform by a cable 50 secured at one end to the winch rod 41 and extends through a hole 51 in platform 3 to position the opposite end 52 situated on top of the platform. End 52 is attached to a snap hook member 53 permitting ease in connecting the object being transported. When the winch is engaged the object to be loaded will slide on the platform or the platform and object will slide together until the platform reaches the support stops 60 on the forward ends of the frame assembly. When the platform reaches the support stops, continued winch force causes the object to continue sliding on the platform until the point of attachment reaches hole 51 in the platform. As the object reaches this point, the winch line is drawn taut and the winch is locked thus securely attaching the object to the support platform along with the support platform to the frame assembly. In order to lock the winch and maintain the platform in the upper position upon the automobile for safe transporting of the object, a plurality of holes are provided in 41 and a correspondingly single hole is formed in bearing 42' to allow a pin (not shown) to be secured therethrough for selective securement of the winch.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt the particular situations and material to the teachings of the invention without departing from its essential teaching.

What is claimed is:

1. A carrier assembly for transporting objects upon a vehicle comprising a pair of channel members extending in a plane downward from the roof of the vehicle to the rear thereof, said channel members interconnected by a cross member coupled adjacent the upper end of each of the channel members, a pair of first bracket means secured to said cross member and adapted to be attached to the roof of a vehicle, said first pair of bracket means including means to be attached to the roof of the vehicle, a pair of second bracket means coupled to said pair of channel members adjacent the second end thereof and adapted to be attached to the body of a vehicle, platform means slidably mounted in said channel member and adapted to support an object to be transported by the vehicle, and motion control means comprising a winch including a rod rotatably mounted within the cross member and a cable interconnecting the rod and platform means, and operatively connected to the upper portion of the channel members for effecting reciprocating movement of the platform means relative to said channel members from a first position adjacent the ground for mounting an object to the platform means to an upper carrying position upon the vehicle.

2. The carrier assembly of claim 1 wherein said first pair of bracket means further include an adjustable tensioning means having one end coupled to said bracket means and a second end adapted to be secured to the underside of the vehicle to support the pair of first bracket means on the vehicle.

3. The carrier assembly of claim 1 wherein said pair of channel members possess a L-shaped configuration to form tracks for slidably supporting said platform means.

4. The carrier assembly of claim 1 wherein said pair of second bracket means include means to be attached to the bumper portion of a vehicle.

5. The carrier assembly of claim 4 further including a rod extending beneath the channel members between said pair of second bracket means.

* * * * *